Figure 1:
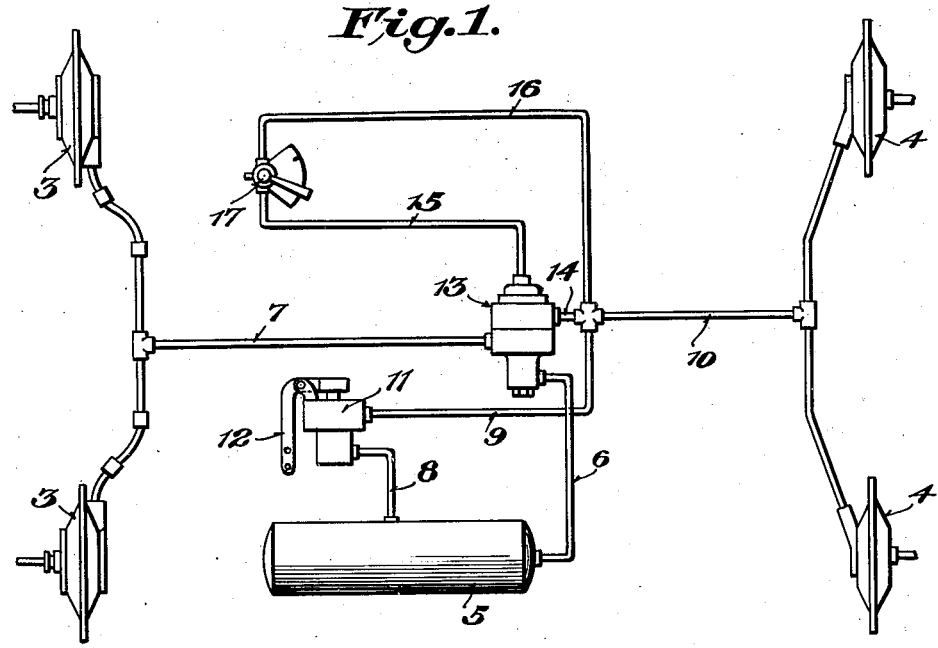

Dec. 1, 1936.    R. H. CASLER ET AL    2,062,500
BRAKE MECHANISM
Filed April 27, 1932

Inventors
Roger H. Casler
Wilfred A. Eaton
By
Attorney

Patented Dec. 1, 1936

2,062,500

UNITED STATES PATENT OFFICE 2,062,500

BRAKE MECHANISM

Roger H. Casler and Wilfred A. Eaton, Pittsburgh, Pa., assignors to Bendix Westinghouse Automotive Air Brake Company, Pittsburgh, Pa., a corporation of Delaware Application April 27, 1932, Serial No. 607,858

9 Claims. (Cl. 188—152)

This invention relates to fluid pressure apparatus and more particularly to a fluid pressure braking system adapted for use in connection with automotive vehicles.

One of the objects of the present invention is to provide in a fluid pressure braking system having front and rear brakes, a novel arrangement for reducing the pressure of the fluid applied to the front brake actuators whereby during application of the brakes locking of the front wheels of the vehicle will be avoided.

Another object of the invention is to provide a novel braking system wherein the braking torque applied to the front wheel brakes will be less than, but proportional to, the braking torque applied to the rear brakes.

Another object is to provide in a fluid pressure braking system for automotive vehicles, a novel fluid pressure reducing apparatus for reducing the pressure of the fluid applied to the front brake actuators in such a manner that the pressure will be dependent upon the pressure of the fluid supplied to the rear brake actuators.

Another object is to provide in a braking system of the above character means, whereby the braking torque applied to the front brakes of the vehicle may be rendered substantially less than or substantially equal to the braking torque applied to the rear brakes at the will of the operator.

A further object is to provide in a braking system of the type embodying front and rear brake actuators, a novel fluid pressure actuated device for applying fluid under pressure to the front brake actuators so constructed that the device will become automatically inoperative when the pressure of the fluid within the front brake actuators has attained a predetermined ratio with respect to the pressure of the fluid within the rear brake actuators.

Still another object is to provide in a fluid pressure braking system of the above character, a novel combined relay and reducing valve structure so constructed that upon application of the rear brakes, the front brakes will be automatically actuated to a predetermined extent of the actuation of the rear brakes.

A still further object is to provide in a structure of the above character, a novel manually controlled arrangement for readily enabling the pressure upon the front brake actuators to be substantially the same as the pressure exerted by the rear brake actuators.

A further object is to provide a novel arrangement of parts so constructed and arranged as to provide an unusually lightweight and compact structure, capable of ready inspection and repair and of such a nature that the same may be manufactured and installed upon existing braking systems at a relatively low cost.

Other objects and features of novelty of the invention will appear more clearly from the following detailed description taken in connection with the accompanying drawing, which illustrates one embodiment of the invention. It is to be expressly understood, however, that the drawing is for purposes of illustration only and is not designed as a definition of the limits of the invention, reference being had for this purpose to the appended claims.

Figure 2:
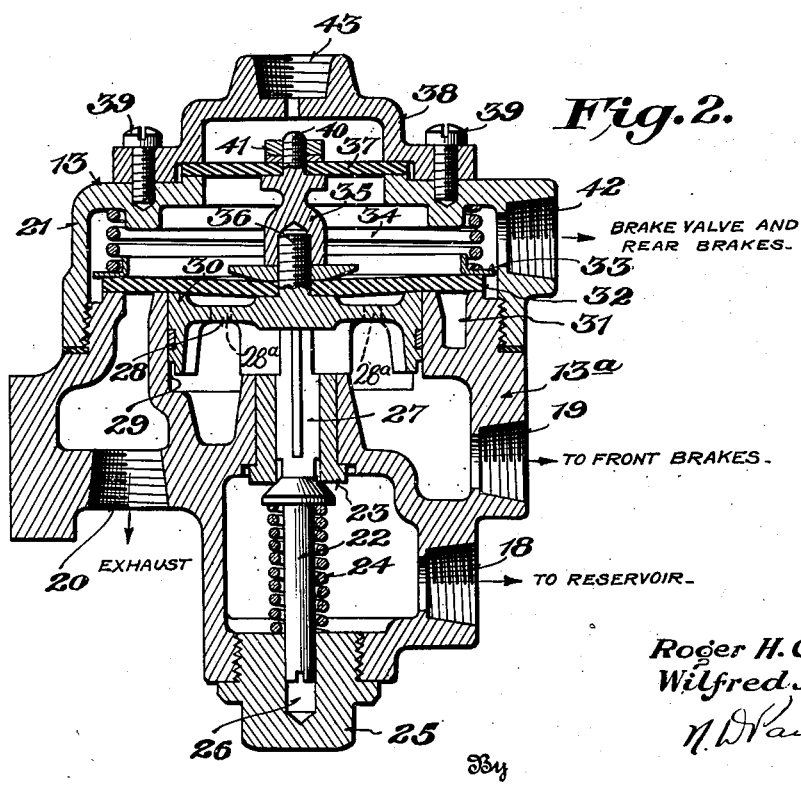

Referring to the drawing:

Fig. 1 illustrates a diagrammatic arrangement of a fluid pressure braking system adaptable for use in connection with automotive vehicles and embodying the present invention, and Fig. 2 is a vertical sectional view of the combined relay and reducing valve illustrated in Fig. 1.

Referring more particularly to Fig. 1, a fluid pressure braking system embodying the present invention is shown therein as including front and rear brake actuators 3 and 4 respectively, a fluid pressure reservoir 5 adapted to be supplied with fluid under pressure by any suitable means, not shown, pipe connections 6 and 7 for conducting fluid under pressure to the front brake actuators, the pipe connections 8, 9 and 10 for applying fluid from the reservoir 5 to the rear brake actuators. A brake valve 11 of well known construction is connected with pipe connections 8 and 9 in order to directly control the application of fluid under pressure to the rear brake actuators and to indirectly control the flow of fluid under pressure to the front brake actuators, as will more particularly appear hereinafter, the brake valve being provided with an actuating arm 12 adapted for connection with the vehicle brake pedal, not shown, by any suitable means. A combined relay and reducing valve 13 is connected with pipe connections 6 and 7 for the purpose of conducting fluid under pressure from the reservoir 5 to the front brake actuators, communication being established between pipe connections 6 and 7 by application of fluid under pressure through pipe connections 9 and 14 when the brake valve 11 is actuated to apply the brakes. As will appear more fully hereinafter, the combined relay and reducing valve 13 is so constructed as to apply a pressure to the front brake actuators less than that applied to the rear brake actuators. Preferably, however, means are provided for rendering this reducing function of the valve 13 inoperative, such means including pipe connections 15 and 16 and manually operable three-way valve 17 in series therewith.

Referring more particularly to Fig. 2, the combined relay and reducing valve 13, embodying certain features of the present invention, is shown therein as including a body portion 13a having tapped openings 18, 19 and 20 therein and a cover 21 suitably secured to the body portion as by screw threads. A valve 22 is provided to control communication between passages 18 and 19 and this valve is seated against a sleeve 23 by a suitable spring 24 retained in the casing by a plug 25 which is also provided with a bore 26 adapted to receive the end of the valve stem to provide a guide therefor. The valve 22 is also provided with an extension 27 suitably splined in the sleeve 23 so as to be guided thereby while at the same time allowing the passage of fluid therearound. The portion 27 of the valve stem is in abutting engagement with a spider 28 slidably mounted in a cylindrical bore 29 in body portion 13a, the spider being apertured at 28a and being preferably provided with upstanding shoulders 30 which are flush with the upper end of bore 29 when the valve 22 is in closed position, for a purpose which will appear more fully hereinafter. An annular exhaust chamber 31 is provided in the body 13a having its upper portion in the same plane as the upper portion of bore 29 and freely communicating with opening 20.

In order to operate valve 22, a pressure sensitive element is provided, responsive to the pressure in line 9 leading to the rear brake actuators. As shown, this element is constituted by a diaphragm 32 lying across the bore 29 and chamber 31 and held in place by an annular ring 33 and a spring 34 acting between the diaphragm and the cover 21. The diaphragm 32 is secured to the spider 28 as by means of a nut 35 threaded onto a projecting stud 36 secured to the spider and extending through the diaphragm. The upper end of cover 21 is closed by a second diaphragm 37 smaller than bore 29 but bearing a predetermined ratio thereto and clamped between cover 21 and a supplemental cover 38 suitably secured thereto as by bolts 39. The diaphragm 37 is secured to nut 35 by means of a stud 40 integral with nut 35 and extending through the diaphragm for threaded engagement with nuts 41. Cover 21 is provided with a tapped opening 42 adapted to receive pipe 14, as shown in Fig. 1, whereby fluid under pressure may be admitted to the space between diaphragms 32 and 37 from pipe 14 when valve 11 is open. Supplemental cover 38 is provided with a tapped opening 43 for the reception of pipe 15 as shown in Fig. 1 for a purpose which will appear more fully hereinafter.

In operation, the pipe 6 leading from the pressure reservoir is connected to opening 18, the pipe 7 leading to the front brake actuators is connected to opening 19, pipe 14 is connected to opening 42, and pipe 15 is connected to opening 43. Assuming that pipes 15 and 16 are interconnected through valve 17, when the valve 11 is opened, fluid under pressure from reservoir 5 passes through pipes 8, 9 and 10 to the rear brake actuators 4 to effect application of the rear brakes and at the same time passes through pipe 14 to the space between diaphragms 32 and 37 thereby forcing the valve 22 to open and admitting pressure through pipe 6, past valve 22 and through pipe 7 to the front brake actuators 3. Thus it will be seen the front brakes will not be applied until after the rear brakes due to the fact that the valve 22 will not be opened to admit pressure to the front brake actuators until pressure has been applied to the rear brake actuators. The diaphragm 32 is held tightly against the upper end of bore 29 by the fluid pressure and is depressed in the center to force stem 27 downwardly in opening valve 22, the diaphragm, during initial flexure, acting as a lever against shoulders 30 to more easily effect initial opening movement of valve 22.

When it is desired to reduce the effective pressure on the front brake actuators 3, valve 17 is positioned to close the pipe 16 and connect pipe 15 to atmosphere thus admitting atmospheric pressure to the upper side of diaphragm 37. Since the lower side of diaphragm 37 is exposed to fluid pressure from pipe 14 this diaphragm will, upon application of fluid under pressure between diaphragms 37 and 32, exert an upward force on nut 35 tending to balance the downward force exerted by diaphragm 32 and thereby reducing the effective downward force tending to open the valve 22 in proportion to the relative effective areas of the two diaphragms. Thus after downward movement of diaphragm 32 to effect an opening of valve 22 thereby permitting fluid under pressure to be applied through pipe 7 to the front brake actuators, the diaphragm will be forced upwardly to close or lap valve 22 by spring 24 and the back pressure in pipe 7 below diaphragm 32, as soon as this latter pressure and the tension of the spring have reached a value bearing substantially the same ratio to the pressure in pipes 9, 10 and 14 and above the diaphragm 32 as the effective area of diaphragm 37 bears to the effective area of diaphragm 32. Consequently the force applied to the front brakes by actuators 3 will be less than that applied to the rear brakes by actuators 4 in substantially the same proportion as that of the effective areas of diaphrams 32 and 37.

When valve 17 is positioned to connect pipes 15 and 16, pressure from pipe 9 is communicated to the upper side of diaphragm 37 thus balancing the pressures on both sides of this diaphragm and rendering the same wholly ineffectual. In this position the entire downward force exerted by diaphragm 32 is effective to open valve 22 and this valve will remain open until the pressures on opposite sides of diaphragm 32 are substantially equal when the pressure on the two groups of actuators 3 and 4 will also be substantially equal as will be readily apparent.

To release the brakes, valve 11 is operated to close pipe 8 and open pipe 9 to atmosphere thus relieving the pressure in pipes 10, 14, 15, 16 and actuators 4. Simultaneously the pressure above diaphragm 32 is relieved and the pressure in pipe 7 acts on the bottom of diaphragm 32 to raise the same above the upper end of bore 29 allowing the fluid under pressure in pipe 7 and actuators 3 to escape into the annular exhaust chamber 31 and out to atmosphere or to a suitable receptacle through opening 20.

Thus there is provided by the present invention a novel fluid pressure braking system in which the force on the front brakes may be either substantially equal to or less than, but proportional to, that on the rear brakes according to the will of an operator. The provision of the relay valve responsive to pressure in the line to the rear brake actuators for controlling admission of fluid under pressure to the front brake actuators enables the rear brakes to be applied slightly prior to application of the front brakes thus tending to prevent skidding of the vehicle and other undesirable effects. The present system is further simple in construction and operation and is readily adapted to be applied to vehicles already equipped with other braking systems.

While there has been illustrated and described only one embodiment of the present invention it is to be understood that the same might be embodied in various structural forms. For example pistons or other pressure sensitive elements might be substituted for the diaphragms illustrated in Fig. 2 or different types of valves or actuators might be substituted for those shown without departing from the scope of the invention. Reference will, therefore, be had to the appended claims for a definition of the limitations of the invention.

What is claimed is:

1. A fluid braking system for automotive vehicles having front and rear brakes comprising a source of fluid under pressure, actuators for said brakes, separate connections between said source and said actuators, a valve in the connection between said source and said front brake actuators for limiting the pressure of the fluid applied to said last-named actuators, a valve in the connection between said source and said rear brake actuators, pressure operated means subjected to the pressure of the fluid supplied said rear brake actuators for operating said first named valve and for preventing communication between said connections, and means under the control of the operator for rendering said first valve inoperative to limit the pressure of the fluid applied to said front brake actuators.

2. A fluid pressure braking system for automotive vehicles having front and rear brakes comprising a source of fluid under pressure, actuators for the brakes, a connection from said source to said rear brake actuators, a valve in said connection, a separate connection from said source to said front brake actuators, a second valve in said last-mentioned connection, and pressure-responsive means for operating said second valve, said pressure-responsive means communicating with the first named connection independently of said second named connection and preventing communication between said connections whereby said second valve will be opened by fluid pressure in said first named connection when said first-mentioned valve is opened.

3. In a fluid pressure braking system for vehicles having front and rear brakes, actuators for said brakes, a source of fluid under pressure, independent connections between said source and said front and rear brake actuators respectively, means including a combined relay and pressure-regulating valve in said connection between said source and said front brake actuators and subject to the pressure of the fluid in the connection between said source and the rear brake actuators for admitting fluid under pressure from said source to said front brake actuators to apply the latter to a degree less than but proportional to the degree of application of the rear brake actuators, and means for rendering the regulating function of said combined valve inoperative at will whereby said front and rear brake actuators may be applied in equal degree.

4. A combined relay and reducing valve comprising a casing, a pair of interconnected pressure-sensitive elements within said casing, said elements defining a chamber therebetween adapted to be connected with fluid under pressure, said elements being of different effective areas, a valve in said casing adapted to control the flow of the fluid under pressure and movable in response to the movement of said elements, a chamber between one of said pressure-sensitive elements and the casing, and means for selectively connecting said last-named chamber with the fluid under pressure or with atmosphere.

5. In a fluid braking system for vehicles having front and rear brakes, a source of fluid under pressure, actuators for said brakes, means for applying fluid under pressure to said rear brake actuators including a connection between said source and said actuators, means for applying fluid under pressure to said front brake actuators, said last-named means including a separate connection between said source and front brake actuators and having a device therein for rendering the pressure of the fluid applied to the front brake actuators less than but directly proportional to the pressure of the fluid applied to the rear brake actuators throughout the range of brake application, and means for rendering the device inoperative to effect a reduction in the pressure of the fluid applied to the front brake actuators.

6. A fluid braking system for automotive vehicles having front and rear brakes comprising a source of fluid under pressure, actuators for the brakes, a connection from said source to said rear brake actuators, a valve in said connection, a separate connection from said source to said front brake actuators, a second valve in said last-named connection for controlling the application of fluid under pressure to said front brake actuators, and means for automatically closing said second valve when the pressure in the front brake actuators bears a predetermined ratio to the pressure in the rear brake actuators, said last named means including a pressure sensitive element subject to the pressure of the fluid conducted to said rear brake actuators.

7. A fluid pressure braking system for automotive vehicles having front and rear brakes comprising a source of fluid under pressure, actuators for the brakes, means for controlling the flow of fluid under pressure to the rear brake actuators, means including a fluid pressure-operated valve for controlling the flow of fluid under pressure to the front brakes, and means operable to automatically operate said valve to interrupt the flow of fluid under pressure to the front brake actuators when the pressure in the latter bears a predetermined ratio to the pressure of the fluid in the rear brake actuators, said last named means including a pair of pressure sensitive diaphragm elements subject to the pressure of the fluid supplied to the rear brake actuators, one of said diaphragm elements preventing communication between said front and rear actuators.

8. A fluid pressure braking system for automotive vehicles having front and rear brakes comprising a source of fluid under pressure, actuators for the brakes, means for controlling the flow of fluid under pressure to the rear brake actuators, means including a fluid pressure-operated valve for controlling the flow of fluid under pressure to the front brakes, means operable to automatically operate said valve to interrupt the flow of fluid under pressure to the front brake actuators when the pressure in the latter bears a predetermined ratio to the pressure of the fluid in the rear brake actuators, said last-named means including a pressure-sensitive element for preventing communication between said front and rear actuators and subject on one side to the pressure of the fluid supplied to the rear brake actuators, and operator-controlled means for subjecting the other side of said pressure-sensitive element to different pressures to vary the said ratio.

9. A fluid braking system for vehicles having front and rear brake actuators comprising a source of fluid under pressure, a connection between said source and said front brake actuators, a combined relay and pressure-reducing valve in said connection, a separate connection between said source and said rear brake actuators, a brake valve in said second connection, and means effective only upon actuation of said brake valve for conveying fluid pressure to said combined relay and pressure-reducing valve for operating the latter to transmit fluid pressure to said front brake actuators at a pressure less than but proportional to the pressure supplied the rear brake actuators throughout the range of braking pressures supplied the last named actuators.

ROGER H. CASLER.
WILFRED A. EATON.